United States Patent [19]

Smith

[11] Patent Number: 4,500,073
[45] Date of Patent: Feb. 19, 1985

[54] ADJUSTABLE LOAD BINDER
[75] Inventor: Lonnie M. Smith, St. Louis, Mo.
[73] Assignee: Durbin-Durgo, Inc., St. Louis, Mo.
[21] Appl. No.: 426,838
[22] Filed: Sep. 29, 1982
[51] Int. Cl.³ .............................................. B25B 25/00
[52] U.S. Cl. .................................... 254/258; 24/68 CT
[58] Field of Search .................. 24/270, 68 CT, 69 T; 254/246, 251–253, 256, 258

[56] References Cited

U.S. PATENT DOCUMENTS

| | | | |
|---|---|---|---|
| 797,715 | 8/1905 | Boyd | 254/258 |
| 1,885,128 | 11/1932 | Montgomery | 24/270 |
| 2,359,492 | 10/1944 | Rockwood et al. | 24/68 CT |
| 2,824,717 | 7/1958 | Yeager | 24/270 |
| 3,418,008 | 12/1968 | Durbin | 254/258 |
| 4,335,489 | 6/1982 | Muller | 24/68 CT |

Primary Examiner—Billy S. Taylor
Attorney, Agent, or Firm—Paul M. Denk

[57] ABSTRACT

An adjustable load binder incorporating a link that is eccentrically and pivotally connected with a clevis, each having a hook securing in opposite directions for providing attachment of the binder with a chain or other tie-down, an adjustable member securing within the construction of the binder, preferably intermediate one or both of the hooks and their connection with their respective lever and clevis, and which adjustment member can be manipulated, through a turning of its integral sleeve, to provide for a lengthening or contraction in the distance between the oppositely extending grab hooks for furnishing a way in which the mechanic can quickly adjust the attachment of the load binder into a tie down position.

3 Claims, 4 Drawing Figures

ADJUSTABLE LOAD BINDER

CROSS REFERENCE TO RELATED PATENTS

The subject matter of this application is related to and comprises an improvement upon the structure of the load binders disclosed in prior U.S. Pat. Nos. 3,418,008, 2,512,491, 2,500,488, and 2,422,001, all owned by a assignee common to the assignee of this current invention and patent application.

BACKGROUND OF THE INVENTION

This invention relates generally to load binders, but more specifically pertains to the addition of structure that renders such binder more adjustable and fascile in usage upon application during the fastening of a load.

There are a variety of prior art patents that relate to various style of load binders that have been availble in the prior art. For example, the assignee of this current invention and application has previously obtained an abundance of prior patents relating to the construction and application of load binders, or load binding devices, and essentially, such binders are constructed and fabricated incorporating an elongated lever means that is pivotally mounted to a clevis, with each having a fastening member, such as a hook, as shown in the prior art, for securement to the load, or its binding or tie down means that is used for securement of a load. These devices are quite prevalent in the art, and are used abundantly particularly by the trucking and other industry for securement of loads when being transported over long distances.

Other prior art type of load binding devices are shown in the prior patents to Juline, U.S. Pat. No. 1,972,346, or in the earlier wire stretcher patent to Brunk, U.S. Pat. No. 1,518,769.

These prior load binders, or rather securement means, as previously explained, are all structured quite similarly in their configuration, but one of the problems that has been experienced in the application of such binders is that the tie-down means, such as the chain, must be of a specific length, or have conveniently positioned lengths that can accommodate the securement of the binder in its loosened configuration easily thereto, but which when the binder is pivoted about its eccentric connection formed between the lever and clevis it has sufficient overlapping pivot to provide for a tightening of the chain upon the positioned load. But, when this particular connection of the binder to the tie down means is not exactly within that range which provides for the conversion of its loosened state to the tightened condition, through the pivoting of the handle, then the mechanic has a problem that cannot easily be overcomed without a total repositioning of the chain or tie down means with respect to the load to be secured. Thus, to overcome this problem, the invention of this current application provides the addition of unique structure into the configuration of a load binder that can be utilized for providing a prompt adjustment to the load binder, in its loosened condition, as secured with the tie down chain, or the truck bed, and always assure a prompt repositioning of the load binder through its integral adjustment to provide for the desired tightness required for the tie down means in binding the load to its surface support.

It is, therefore, the principal object of this invention to provide a load binder incorporating adjustment means that facilitates its usage in tying down a load.

Another object of this invention is to provide a load binder having adjustment means that may be provided integrally in at least two positions so as to furnish a wide range of adjustment in a positioning of the load binder in preparation for its tightening into a securing position.

Another object of this invention is provide an adjustable load binder that can easily and quickly be manipulated by the mechanic for securement of a load upon a truck bed or other support.

Still another object of this invention is to provide an adjustable load binder that can be fascily manually adjusted into that size required for a tie-down.

Another object is to provide a safer final chain tension in the final over center locking position of the adjusted load binder.

Other objects and advantages may become more apparent to those skilled in the art upon reviewing the summary of this invention, and upon undertaking a study of the description of its preferred embodiment in view of the drawings.

SUMMARY OF THE INVENTION

This invention comtemplates the construction of a load binder that incorporates one or more adjustable features so as to facilitate the application of the binder to the tie down means during application. More specifically, the load binder is of the usual construction, as will be subsequently explained in this application, but essentially the adjustable feature includes the addition of adjustment means intermediate one or both of the securing means, such as the hooks or grab hooks, and their attachment with their respective lever or clevis means that form the embodiment of the complete load binder. One of more of these adjustment means may be included within the integral construction of the binder, but each adjustment means includes a sleeve like member, containing boss like means at one or more both ends, and being threaded, so that a threaded connector may be engaged therein and which may lengthen or shorten the distance between each securing means and the basic binder in order to provide a quick readjustment in the length segments of the binder in its attachment intermediate the tie down means. Each connector means has an eyelet provided at least at one end, opposite from its threaded shank, and the eyelet is available for permanent securement with the hook means normally used for interconnecting with the chain or other tie down means. The opposite end of the sleeve means, if it does not include a threaded connector, incorporates a swivel connection between it and the structure to which it attaches, which may be either the lever or clevis means, or perhaps to the hook as previously explained. In any event, the addition of one or more of these adjustment means intermediate the hook means and the basic components of the binder, such as the lever and clevis means, provides a means for quick adjustment of the binder upon its application to the tie down chain, and if some adjustment is needed, the mechanic may simply rotate the sleeve of the adjustment means into that direction which either extends or retracts the overall length distance of the load binder within it securing position.

DESCRIPTION OF THE PREFERRED EMBODIMENT

Figure 1:
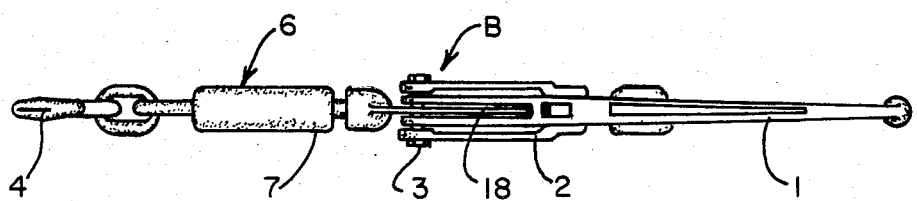
FIG. 1 provides a top view of the adjustable load binder of this invention.
Figure 2:
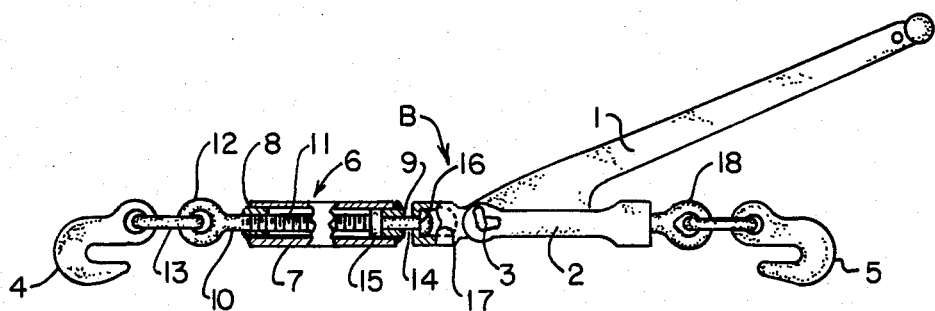
FIG. 2 provides a side view of the load binder shown in FIG. 1, with a partial transverse section being taken through the adjustment means so as to reveal its internal structure.

In referring to the drawings, and in particular FIGS. 1 and 2, there is disclosed the adjustable load binder of this invention. This load binder, as identified at B, includes the usual lever means 1 that is pivotally connected within the clevis means 2, as about its pivot pin 3, so that when the lever means 1 is in the position as shown in these Figures, it provides for a retraction in the distance between the securing means 4 and 5, comprising the hooks or grab hooks, as shown, but that when the lever means 1 is pivoted in an opposite direction, or counterclockwise from that which is shown in FIG. 2, it provides for an elongation in the distance between said hooks that facilitates the removal, or application, of the load binder from its operative position. This particular feature in the construction and operation of the load binder is commonly known in the art, and is thoroughly reviewed and described in the citation of prior art patents previously identified herein.

The inventive feature of this disclosure includes the addition of an adjustment means, as at 6, into the construction of this load binder, and its adjustment means includes structure in the category of a sleeve member 7, structured having a pair of bosses or inserts, such as threaded plug inserts, as at 8 and 9, either applied or integrally formed proximate each end of the said sleeve 7, with these inserts cooperating with other means for furnishing the securement of the adjustment means within the structure of the load binder. For example, a threaded connector 10, including a threaded shank portion 11, threadedly engages within the insert 8, with the connector having an eyelet integrally formed at its opposite end, as at 12, for securement with the linkage, or side weld link, 13 connecting with the aforesaid hook 4. At its opposite end the adjustment means 6 includes a swivel connection comprising the swivel stud 14 being held within the sleeve 7 through the arrangement of its integral head 15 within the insert 9, while the opposite end of the swivel member 14 includes a further integral head 16 provided within the formed space, as at 17, that attaches by means of a link 18 with the lever 1. As can be seen, both the swivel head 16, in addition to the formed space 17 are conveniently shaped rather arcuately, so as to facilitate the free movement of the swivel means therein during usage and application of the load binder.

While the shown embodiment, as previously explained with respect to FIG. 2, may disclose a single connecting means 10 used in association with the swivel means 14, it is just as likely that a pair of threaded connectors, as at 10, may be threaded into both ends of the sleeve 7 of the adjustment means 6, so as to furnish a manner for quickly obtaining an adjustment in the members length displacement, at double the adjustment dimension, through a singular turning of its adjustment sleeve 7. The threads of each such threaded connector will be the reverse of each other.

As can be seen at the opposite end of the load binder, the hook means 5, comprising a part of the securing means, is held by means of a swivel connection 18 and its associated side weld link to the back of the clevis member 2, as previously explained.

Figure 3:
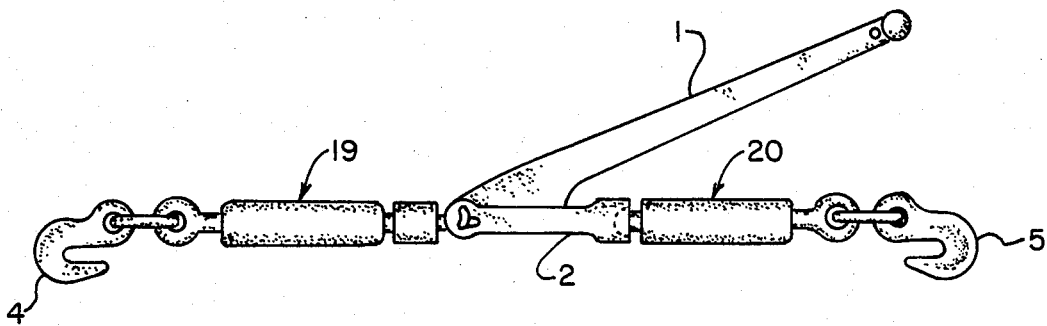
FIG. 3 provides a full side view of the adjustable load binder of this invention, but also showing the addition of a second adjustment means being located at the opposite end of the said binder.
Figure 4:
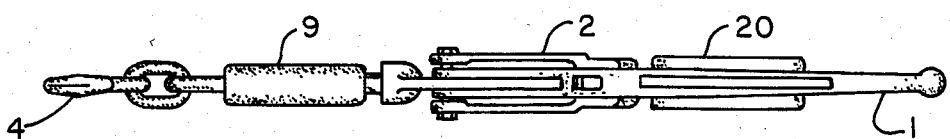
FIG. 4 provides a top view of the modified adjustable load binder previously disclosed in FIG. 3.

In referring to FIGS. 3 and 4, the adjustable load binder is provided with a method for obtaining a quick adjustment at twice the adjustable dimensions that can be obtained from the binder as previously shown and described. For example, a pair of adjustment means 19 and 20 are provided intermediate their respective connections with the lever means 1, and to the grab hook securement means 4, and of the clevis 2 with its hook means 5. Thus, a simple turning of each of the sleeves formed of these adjustment members 19 and 20, each of the members being formed identical to that which has been previously described in the construction of the adjustment member 6, can provide for a double length in the adjustment between the hook means 4 and 5, as when the binder is being extended, or a retraction in their distance apart as when the adjustment members are turned in the direction that provides for a drawing in of the threaded connector 10 during binder adjustment. Where a threaded connector 10 is provided at each end of the sleeve 7, where an adjustment means 6 is provided at each end of the binder B, then the quick adjustment obtained is fourfold.

Variation or modifications to the structure of this invention may occur to those skilled in the art upon reviewing the subject matter of this disclosure. Such variations or modifications, if yet within the spirit of this invention, are intended to be emcompassed within the scope of any claims to patent protection issuing hereon. The description of the embodiment set forth herein is done so for illustrative purpose only.

Having thus described the invention, what is claimed and desired to be secured by Letters Patent is:

1. In an adjustable load binder for use in securing a load held by tie means such as a chain, cable, or the like, said binder being of the type including a lever means and a clevis means, each having a securing means connected thereto for fastening onto the said tie means during load securement, pivot means mounting said lever means for shifting with respect to the said clevis means in, a first direction to a binding position and in an opposite direction to a second, loosened position, the improvement which comprises, an adjustable linkage interconnecting between one of the said securing means and one of the lever means and clevis means for facilitating the prompt adjustment of the load binder during attachment to the tie means, said adjustable linkage being disposed remote and exteriorly of the lever means and clevis means to avoid any interference with their functioning, the adjustable linkage including a sleeve member having opposite ends, thread means provided within the sleeve member, a threaded connector adjustably connecting with one of the ends of the sleeve member, the connector attaching the adjustable linkage to one of the securing means, and a swivel connector attached to the opposite end of the sleeve member and attaching the adjustable linkage to one of the lever means and clevis means, and wherein the said swivel means includes a stud means, said stud means being shaped at one end to facilitate the maneuverability of the adjustment means in its connection with the load binder.

2. The invention of claim 1 and wherein an adjustable linkage interconnects between each securing means and the lever and clevis means.

3. The invention of claim 1 and wherein each sleeve member having substantial length for provision of external surface for fascile manual gripping and manipulation during readjustment of the adjustable linkage of said load binder.

* * * * *

UNITED STATES PATENT AND TRADEMARK OFFICE
CERTIFICATE OF CORRECTION

PATENT NO. : 4,500,073
DATED : February 19, 1985
INVENTOR(S) : Lonnie M. Smith

It is certified that error appears in the above—identified patent and that said Letters Patent is hereby corrected as shown below:

Column 4, line 49, please change "in, a " to ---in a---.

On the title page, [73] Assignee, please change "Durbin-Durgo, Inc." to ---Durbin-Durco, Inc.---.

Signed and Sealed this

Thirtieth Day of July 1985

[SEAL]

Attest:

DONALD J. QUIGG

Attesting Officer     Acting Commissioner of Patents and Trademarks